United States Patent [19]

Wardell, Jr.

[11] Patent Number: 4,573,935
[45] Date of Patent: Mar. 4, 1986

[54] SEALING FIXTURE FOR COLOR KINESCOPES

[75] Inventor: Myron H. Wardell, Jr., Lititz, Pa.

[73] Assignee: RCA Corporation, Princeton, N.J.

[21] Appl. No.: 572,152

[22] Filed: Jan. 19, 1984

[51] Int. Cl.$^4$ ............................................. H01J 9/24
[52] U.S. Cl. ........................................ 445/66; 445/63
[58] Field of Search ................ 445/63, 66, 23, 24, 445/25; 269/908

[56] References Cited

U.S. PATENT DOCUMENTS

| | | | |
|---|---|---|---|
| 3,118,662 | 1/1964 | Fassett | 269/908 |
| 3,329,422 | 7/1967 | Hajduk | 269/908 |
| 3,737,065 | 6/1973 | Palac | 220/2.1 |
| 3,787,937 | 1/1974 | Palac | 29/24.13 |
| 3,989,233 | 11/1976 | Wardell, Jr. | 269/296 |
| 4,200,274 | 4/1980 | Turner | 269/319 |
| 4,405,950 | 9/1983 | Wardell | 445/63 |

FOREIGN PATENT DOCUMENTS

| | | | |
|---|---|---|---|
| 155442 | 12/1980 | Japan | 445/66 |
| 55033 | 4/1982 | Japan | 269/908 |
| 0088645 | 6/1982 | Japan | 445/23 |
| 2021994 | 12/1979 | United Kingdom | 445/66 |
| 395923 | 1/1974 | U.S.S.R. | 269/908 |

Primary Examiner—Kenneth J. Ramsey
Assistant Examiner—Kurt Rowan
Attorney, Agent, or Firm—D. H. Irlbeck; L. L. Hallacher; T. H. Magee

[57] ABSTRACT

A sealing fixture for aligning the sealing edges of a funnel and a panel of a kinescope during fritting is tilted so that a funnel placed in the fixture is gravity moved toward a corner of the fixture. All contact between the funnel and the fixture is made through rotatable referencing elements so that gravity accurately positions the funnel in the fixture.

6 Claims, 2 Drawing Figures

SEALING FIXTURE FOR COLOR KINESCOPES

BACKGROUND OF THE INVENTION

This invention relates generally to the production of kinescopes for color television receivers and particularly to a fixture for accurately aligning the sealing edges of the panel and funnel of such kinescopes prior to fritting the panel and funnel together.

A kinescope for a color television receiver produces a visual display by scanning three electron beams across a phosphor screen which emits light upon impact by electrons. The phosphor screen is arranged on the inside surface of a faceplate panel and is composed of triads of phosphors which produce the three different colors of light when scanned with electron beams. The electron beams are provided by electron guns which are supported in a cylindrical neck. The neck is attached to a funnel-shaped portion by a contoured portion. The electron beams are directed toward the screen and are deflected horizontally and vertically by a magnetic yoke which is arranged at the contoured portion of the funnel. A shadow mask is arranged between the electron guns and the phosphor screen and the three electron beams are converged at the shadow mask. The shadow mask contains a large plurality of apertures through which the electron beams pass prior to impacting the phosphor screen. The shadow maks serves as a color-section electrode to cause each of the three electron beams to impact a phosphor of a proper color.

After the phosphor screen is produced on the inside surface of the faceplate panel, and the shadow mask is inserted it is necessary to permanently affix the faceplate panel to the funnel. This is accomplished by providing both the faceplate panel and the funnel with mating sealing edges. A frit material is placed on the sealing edge of one of the elements and the elements are then placed in a fixture which aligns the two elements. The fixture along with the funnel and faceplate panel are then passed through an oven which solidifies the frit material to permanently and hermetically join the panel and the funnel.

Because during the operation of the kinescope, it is necessary for a particular electron beam to impact a phosphor which emits a particular color of light, it is essential that the faceplate panel and funnel be accurately aligned prior to permanently joining the two elements. In the prior art, the fixture which supports the funnel and the panel during fritting has been provided with referencing pins which are intended to accurately align the sealing edges of the funnel and the panel. However, problems frequently arise because the referencing pins sometimes wear or are broken resulting in unacceptable alignment. Additionally, with the prior art devices, loading of the components onto the fixtures is done manually so that the individual placing the funnels and panels into the fixture can attempt to verify that the elements properly contact the referencing members. Manual leading also is required; because the funnel slides along the reference pins. The friction between the funnel glass and pins is high and it, therefore, is possible for a funnel to be inaccurately positioned in the fixture and thus fail to contact all the reference pins. The present trend toward the automation of production results in a need for a fixture which will permit the automatic loading of the funnels and panels onto the sealing fixture while simultaneously assuring the accurate alignment of the elements without the need for manual verification.

There also is a need for a fixture which minimizes the friction between the funnel and the fixture so that gravity can be relied on to accurately position the funnel in the fixture. The instant invention fulfills this need by the provision of a sealing fixture for color kinescopes in which all contact with the kinescope funnel and the fixture is accomplished through rotatable referencing elements to thereby minimize wear of the referencing members and also to minimize friction between the funnel and the fixture to assure that gravity accurately positions the funnel in the fixture.

SUMMARY

A fixture for supporting and accurately positioning the faceplate panel and funnel of a kinescope envelope during fritting includes a referencing frame configured to engage at least two adjacent sides of the panel and funnel. The frame is tilted with respect to a vertical axis whereby the longitudinal axis of a funnel supported by the fixture tilts toward the juncture of the two sides. Support members are fixed to the referencing frame and support funnel referencing elements at a first preselected distance from the frame. The support members also support panel referencing elements a second predetermined distance from the frame. The funnel referencing elements are rotatable about axes substantially parallel to the frame. Neck positioning members are arranged to receive the funnel neck. The neck positioning members are rotatable about axes extending substantially parallel to one another and tilted with respect to the vertical axis whereby the neck is gravity centered between the neck positioning members by rotation of the members. A funnel urging member is positioned to contact the funnel and urge the funnel toward the funnel referencing elements. The funnel urging member is rotatable about an axis angularly disposed with respect to the longitudinal axis of the funnel.

DETAILED DESCRIPTION

Figure 1:
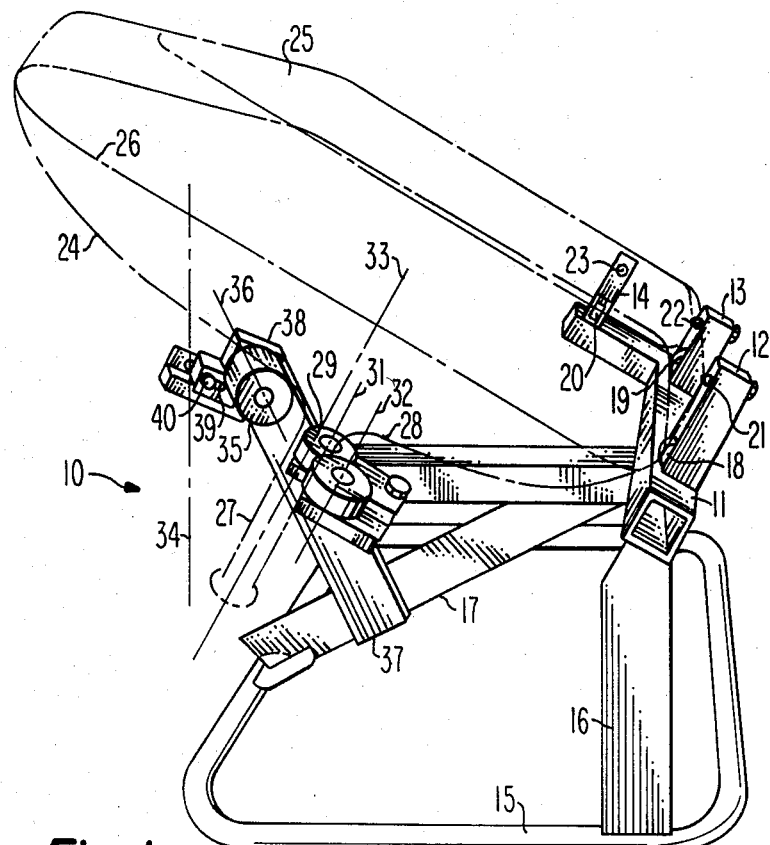
FIG. 1 is a perspective view of a preferred embodiment.

In FIG. 1, a sealing fixture 10, in accordance with the invention, includes a substantially L-shaped referencing frame 11 having two support members 12 and 13 fixed to the long side and a single support member 14 fixed to the short side. The referencing frame 11 is supported above a base 15 by appropriate braces 16 and 17. The referencing frame 11 is oriented with respect to base 15 such that support member 13 is closer to base 15 than support member 14 and member 13 is closer to base 15 than member 12. The support members 12, 13 and 14 respectively support funnel referencing elements 18, 19 and 20, all of which are supported the same preselected distance from the referencing frame 11. The funnel referencing elements 18, 19 and 20 are constructed such that they have a curved surface to contact the funnel whereby the referencing elements roll when contacted by the funnel. In the preferred embodiment shown, the funnel referencing elements 18, 19 and 20 are disc-shaped elements arranged to rotate about axes which are substantially parallel to the legs of the L-shaped referencing frame 11 whereby a funnel placed in the fixture contacts the edges of the disc-shaped elements.

The support members 12, 13 and 14 also support panel referencing elements 21, 22 and 23, respectively. The panel referencing elements 21, 22 and 23 are spaced the same second preselected distance from the L-shaped referencing frame 11. The panel-referencing elements 21, 22 and 23 are shown as adjustable pins which are adjusted so that the ends of the pins extend beyond the support elements 12, 13 and 14 substantially the same distance as the radius of the funnel referencing elements 18, 19 and 20. Accordingly, the ends of the pins and the tangents of the discs are substantially the same distance from the centers of the support members.

A kinescope envelope composed of a funnel 24 and a panel 25 is shown in phantom lines. The funnel 24 and panel 25 both include congruent sealing edges which meet along a sealing seam 26. A frit material is applied to either the funnel or the panel and the two elements are placed in the fixture 10. The funnel referencing elements 18, 19 and 20 and the panel referencing elements 21, 22 and 23 serve to accurately align the sealing edges of funnel 24 and panel 25. The funnel 24 includes a neck 27 which is permanently affixed to the remainder of the funnel 24 by a contoured portion 28. The neck 27 is centered in the funnel 24 and thus is centered with respect to panel 25 when the funnel and neck are fritted together. The sealing fixture 10 includes two neck positioning members 29 and 30 having a curved surface to contact the funnel 24. The neck positioning members 29 and 30 are rotatable, about substantially parallel axes 31 and 32, respectively. Accordingly, the neck 27 of a funnel 24 which is placed into the fixture 10 automatically is centered between the neck positioning members 29 and 30. Additionally, the neck positioning members 29 and 30 are located in the fixture 10 such that these position a funnel 24 at the desired location so that the sealing edge of the funnel rests against the funnel referencing elements 18, 19 and 20. In the preferred embodiment shown, the neck positioning members are disc-shaped members arranged such that the edges contact the funnel. The longitudinal axis 33 of the funnel and the axes 31 and 32 of the neck positioning members 29 and 30 tilt away from the vertical axis 34 in both planes so that the corner of a funnel which is supported by the funnel referencing elements 19 and 20 is lower than the other three corners of the funnel.

A funnel urging member 35 is supported by a brace 37 to contact the contoured portion 28 of the funnel 24. The funnel urging member 35 has a curved surface for contacting the funnel 24 and is rotatable about an axis 36. In the preferred embodiment shown, the funnel urging member 35 is a disc-shaped member the edge of which contacts the funnel. The axis 36 is angularly disposed with respect to the longitudinal axis 33 of the neck 27. Because the funnel urging member 35 contacts the contoured portion 28 of the funnel 24, the funnel is urged toward the funnel referencing elements 18, 19 and 20. The funnel urging member 35 is coupled to brace 37 by a bracket 38 having a slot 39. A bolt 40 passes through the slot 39 and is threaded into the brace 37 whereby the position of the funnel urging member 35 can be adjusted to accommodate different types of envelopes. The neck positioning members 29 and 30 are positioned to contact the neck 27 as near as possible to the contoured portion 28 so that there is a minimum bending force applied to the neck 27. Such a bending force tends to bend the neck while the kinescope passes through the high temperature oven which sets the frit material. The electron guns are supported in the neck and accordingly the bending of the neck must be minimized.

Figure 2:
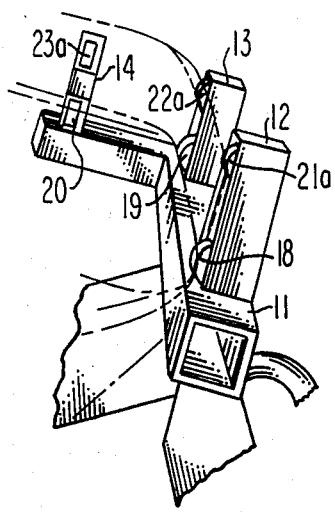
FIG. 2 is a partial perspective view of another embodiment.

In operation, the funnel 24 can be placed into the sealing fixture 10 by an automatic loading machine. When the neck 27 contacts either of the neck positioning members 29 or 30, the ability of the neck positioning members to rotate causes the neck 27 to center between the two discs. Additionally, the ability of the funnel urging member 35 to rotate allows the funnel 24 to easily slide into the desired position in the L-shaped referencing frame 11 because the rotation minimizes sliding friction between the urging member 35 and the funnel 24. Accordingly, the force of gravity, and any vibration of the conveyor along which the sealing fixture 10 moves cause the funnel to be positioned against the funnel referencing elements 18, 19 and 20. Because the funnel referencing elements 18, 19 and 20 also rotate, sliding friction forces are eliminated and the weight of the funnel causes the funnel to accurately position itself against the funnel referencing elements. The weight of the funnel is sufficient to permit the neck 27 to slide along the edges of the neck positioning members 29 and 30 so that the optimum position for the funnel is automatically assumed within the sealing fixture 10. The panel 25 is made of heavy glass and thus when the panel is placed upon the funnel 24, the weight of the panel is sufficient to permit the panel to slide along the ends of the panel referencing elements 21, 22 and 23 so that the sealing edges of the panel and funnel are accurately aligned. If desired, the panel referencing elements 21, 22 and 23 can also be discs arranged to rotate in the same direction as the discs 21a, 22a and 23a, as shown in FIG. 2, which are 18, 19 and 20 to eliminate sliding friction between the panel and the panel referencing elements.

In operation, a funnel is either manually or automatically inserted between the neck positioning members 29 and 30 and the urging member 35. Because the members 29 and 30 are rotatable, the neck automatically centers itself on the members. Additionally, because the urging member 38 is rotatable about an axis angularly disposed with respect to the axis of the neck, the funnel rolls toward the funnel referencing elements 18, 19 and 20. The funnel referencing elements 18, 19 and 20 also are rotatable and, therefore, contact between the funnel and the funnel referencing elements causes the elements to rotate and the funnel assumes the desired position in the fixture 10. When the panel 25 is placed onto the funnel, the weight of the panel causes the panel to contact the panel referencing elements 21, 22 and 23 to accurately position the panel on the funnel and in the fixture. The certainty of accurately positioning the panel can be enhanced by using rotatable discs for the panel referencing elements 21, 22 and 23. Thus, with the invention, all contact between the funnel 24 and the sealing fixture 10 is made through rotatable elements so that sliding friction forces are eliminated and the accurate positioning of the funnel is effected by the force of gravity and also by vibration of the fixture because of movement along a conveyor. For these reasons, the funnel 24 and panel 25 are accurately aligned within the fixture without the need for manual manipulation or verification.

What is claimed is:

1. A fixture for supporting and accurately positioning the faceplate panel and funnel of a substantially rectangular kinescope envelope during the fritting together of said panel and said funnel, said panel and said funnel having mating sealable edges along which fritting occurs, and said funnel including a neck portion affixed to the remainder of said funnel through a contoured portion; said fixture comprising:

a referencing frame configured to engage at least two adjacent sides of said panel and said funnel, said frame being tilted with respect to a vertical axis whereby the longitudinal axis of said funnel supported by said fixture tilts toward the juncture of said two sides;

a plurality of support members fixed to said referencing frame along both of said two sides, each of said support members supporting a funnel referencing element and a panel referencing element, said funnel referencing elements being spaced a first predetermined distance from said frame whereby at least two of said funnel referencing elements contact one of said sides of said funnel in the proximity of said sealable edge and at least one of said funnel referencing elements contacts the other side of said funnel in the proximity of said sealable edge, said funnel referencing elements being rotatable about fixed axes substantially parallel to said frame, said panel referencing elements being spaced a second predetermined distance from said frame whereby said panel referencing elements contact said two sides of said panel;

a plurality of neck positioning means arranged to receive said neck portion in the proximity of said contoured portion, said neck positioning means being rotatable about axes extending substantially parallel to one another and being tilted with respect to a vertical axis whereby said neck portion is gravity centered between said neck positioning means by rotation of said neck positioning means; and funnel urging means positioned to contact said contoured portion and urge said funnel toward said funnel referencing elements, said funnel urging means being a disc-shaped member rotatable about a fixed axis angularly disposed with respect to said funnel longitudinal axis.

2. The fixture of claim 1 wherein said funnel referencing elements and said neck positioning means are rotatable members having a curved surface for contacting said funnel whereby all contact of said funnel with said members is through said curved surfaces to enhance the movement of said funnel toward said funnel referencing elements by rotation of said curved surfaces.

3. The fixture of claim 2 wherein said members are disc-shaped members rotatable about fixed axes and arranged so that the edges contact said funnel.

4. The fixture of claim 2 wherein said panel referencing elements are rotatable elements having a curved surface for contacting said panel whereby said panel is positioned in said fixture by rotation of said panel referencing elements.

5. The fixture of claim 4 wherein said panel referencing elements are disc-shaped elements arranged to rotate about axes substantially parallel to said frame and so that said panel contacts the edges of said disc-shaped elements.

6. The fixture of claim 2 wherein said referencing frame is substantially L-shaped.

* * * * *

UNITED STATES PATENT AND TRADEMARK OFFICE
CERTIFICATE OF CORRECTION

PATENT NO. : 4,573,935

DATED : March 4, 1986

INVENTOR(S) : Myron Henry Wardell, Jr.

It is certified that error appears in the above-identified patent and that said Letters Patent is hereby corrected as shown below:

Col. 4, line 31: after "discs' insert -- 21a, 22a, and 23a, as shown in FIG. 2, which are --.

Col. 4, line 32: after "discs" delete -- 21a, 22a, and 23a, as shown in FIG. 2, which are --.

Signed and Sealed this

Thirtieth Day of September 1986

[SEAL]

Attest:

DONALD J. QUIGG

Attesting Officer

Commissioner of Patents and Trademarks